(12) United States Patent
Ichida (10) Patent No.: US 11,216,584 B2
(45) Date of Patent: Jan. 4, 2022

(54) MANAGEMENT SERVER, DATA VIEWING SYSTEM, AND NON-TRANSITORY COMPUTER READABLE MEDIUM

(71) Applicant: FUJIFILM BUSINESS INNOVATION CORP., Tokyo (JP)

(72) Inventor: Hajime Ichida, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 472 days.

(21) Appl. No.: 16/027,461

(22) Filed: Jul. 5, 2018

(65) Prior Publication Data
US 2019/0026487 A1    Jan. 24, 2019

(30) Foreign Application Priority Data
Jul. 18, 2017    (JP) .............................. JP2017-139330

(51) Int. Cl.
*H04L 29/06*    (2006.01)
*G06F 21/62*    (2013.01)
*H04N 1/00*    (2006.01)

(52) U.S. Cl.
CPC ...... *G06F 21/6245* (2013.01); *G06F 21/6254* (2013.01); *H04L 63/0407* (2013.01); *H04L 63/123* (2013.01); *H04N 1/00042* (2013.01); *H04N 1/00079* (2013.01); *H04L 63/0861* (2013.01); *H04N 2201/0094* (2013.01)

(58) Field of Classification Search
CPC ....... H04L 63/00; H04L 63/123; G06F 16/00; G06F 21/6245; H04W 4/00; H04N 1/00042; H04N 1/00079; H04N 2201/0094
See application file for complete search history.

(56) References Cited

U.S. PATENT DOCUMENTS

| 8,055,993 B2* | 11/2011 | Petri | ..................... G06F 16/954 |
| | | | 715/205 |
| 10,049,227 B1* | 8/2018 | Sampson | ............ G06F 21/6218 |
| 2007/0005967 A1* | 1/2007 | Mister | ................... H04L 9/3228 |
| | | | 713/168 |

(Continued)

FOREIGN PATENT DOCUMENTS

| JP | 2003-099295 A | 4/2003 |
| JP | 2009-098706 A | 5/2009 |

(Continued)

OTHER PUBLICATIONS

Apr. 13, 2021 Office Action issued in Japanese Patent Application No. 2017-139330.

(Continued)

*Primary Examiner* — Joseph P Hirl
*Assistant Examiner* — Leynna Truvan
(74) *Attorney, Agent, or Firm* — Oliff PLC (57) ABSTRACT

A management server includes a transfer unit and a transmission unit. The transfer unit conceals, in a case where personal information is included in usage history data of an apparatus, the personal information, and transfers the usage history data to a server. The transmission unit transmits, in a case where analysis data of the usage history data is transmitted to a terminal, restoration information for restoring the concealed personal information included in the analysis data to the terminal.

17 Claims, 11 Drawing Sheets

(56) References Cited

U.S. PATENT DOCUMENTS

| | | | | |
|---|---|---|---|---|
| 2013/0159021 A1* | 6/2013 | Felsher | ............. | G06Q 30/0283 |
| | | | | 705/3 |
| 2016/0004873 A1* | 1/2016 | Bao | .................... | G06F 21/6254 |
| | | | | 713/189 |
| 2016/0246979 A1* | 8/2016 | Rakshit | .............. | G06F 21/6245 |

FOREIGN PATENT DOCUMENTS

| | | |
|---|---|---|
| JP | 5593370 B2 | 9/2014 |
| JP | 2016-177345 A | 10/2016 |

OTHER PUBLICATIONS

Oct. 26, 2021 Office Action issued in Japanese Patent Application No. 2017-139330.

* cited by examiner

| ITEM | INFORMATION TO BE WRITTEN |
|---|---|
| DATE | Date Time |
| USER NAME | User |
| AGE | OBTAIN Age INFORMATION FROM USER INFORMATION OF User |
| NUMBER OF COLOR PAGES | Color Pages |
| NUMBER OF MONOCHROME PAGES | Monochrome Pages |

FIG. 6

| SECURITY INFORMATION | RULE FOR CONVERSION |
|---|---|
| User | REPLACE WITH ID FOR MASKING (e.g. REPLACE WITH GUID) |
| Age | CONVERT AGE TO DECADE-BASED AGE GROUP |
| Town | INCLUDE INFORMATION DOWN TO PREFECTURE (e.g. ONLY KANAGAWA, JAPAN) IN REGIONAL INFORMATION |

FIG. 7

| User | Age | Town | Name | | |
|---|---|---|---|---|---|
| XX12345 | 24 | Minatomirai, Nishi-ku Yokohama, KANAGAWA, JAPAN | Yuma | | |
| | | | | | |
| | | | | | |

FIG. 9

| Date Time | User | Operation | Color Pages | Monochrome Pages | ... |
|---|---|---|---|---|---|
| 2017-04-08T05:30:00Z | XX12345 | PRINT | 5 | 0 | |
| 2017-04-08T05:30:00Z | XX12345 | COPY | 0 | 10 | |

FIG. 10

| DATE | USER NAME | AGE | NUMBER OF COLOR PAGES | NUMBER OF MONOCHROME PAGES |
|---|---|---|---|---|
| 2017-04-08T05:30:00Z | {973497A4-9B00-4048-94C3-9766233A6E02} | 20 | 5 | 0 |
| 2017-04-08T05:30:00Z | {973497A4-9B00-4048-94C3-9766233A6E02} | 20 | 0 | 10 |

| USER | JAN 2017 | | FEB 2017 | | MAR 2017 | | TOTAL | |
|---|---|---|---|---|---|---|---|---|
| | NUMBER OF COLOR PAGES | NUMBER OF MONOCHROME PAGES | NUMBER OF COLOR PAGES | NUMBER OF MONOCHROME PAGES | NUMBER OF COLOR PAGES | NUMBER OF MONOCHROME PAGES | NUMBER OF COLOR PAGES | NUMBER OF MONOCHROME PAGES |
| {973497A4-9B00-4048-94C3-9766233A6E02} | 100 | 200 | 100 | 300 | 50 | 500 | 250 | 1000 |

FIG. 13

| USER | JAN 2017 | | FEB 2017 | | MAR 2017 | | TOTAL | |
|---|---|---|---|---|---|---|---|---|
| | NUMBER OF COLOR PAGES | NUMBER OF MONOCHROME PAGES | NUMBER OF COLOR PAGES | NUMBER OF MONOCHROME PAGES | NUMBER OF COLOR PAGES | NUMBER OF MONOCHROME PAGES | NUMBER OF COLOR PAGES | NUMBER OF MONOCHROME PAGES |
| XX12345 | 100 | 200 | 100 | 300 | 50 | 500 | 250 | 1000 |

FIG. 14

| SECURITY INFORMATION | RULE FOR CONVERSION |
|---|---|
| User | WHEN USER NAME IS UNMASKED, DISPLAY, IN PARENTHESES, Name OBTAINED FROM PROFILE OF User (e.g. XX12345(Yuma)) |

FIG. 15

| USER | JAN 2017 | | FEB 2017 | | MAR 2017 | | TOTAL | |
|---|---|---|---|---|---|---|---|---|
| | NUMBER OF COLOR PAGES | NUMBER OF MONOCHROME PAGES | NUMBER OF COLOR PAGES | NUMBER OF MONOCHROME PAGES | NUMBER OF COLOR PAGES | NUMBER OF MONOCHROME PAGES | NUMBER OF COLOR PAGES | NUMBER OF MONOCHROME PAGES |
| XX12345 (Yuma) | 100 | 200 | 100 | 300 | 50 | 500 | 250 | 1000 |

FIG. 16

MANAGEMENT SERVER, DATA VIEWING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-139330 filed Jul. 18, 2017.

BACKGROUND

Technical Field

The present invention relates to a management server, a data viewing system, and a non-transitory computer readable medium.

SUMMARY

According to an aspect of the invention, there is provided a management server including a transfer unit and a transmission unit. The transfer unit conceals, in a case where personal information is included in usage history data of an apparatus, the personal information, and transfers the usage history data to a server. The transmission unit transmits, in a case where analysis data of the usage history data is transmitted to a terminal, restoration information for restoring the concealed personal information included in the analysis data to the terminal.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the present invention will be described with reference to the drawings.

First Exemplary Embodiment

Figure 1:
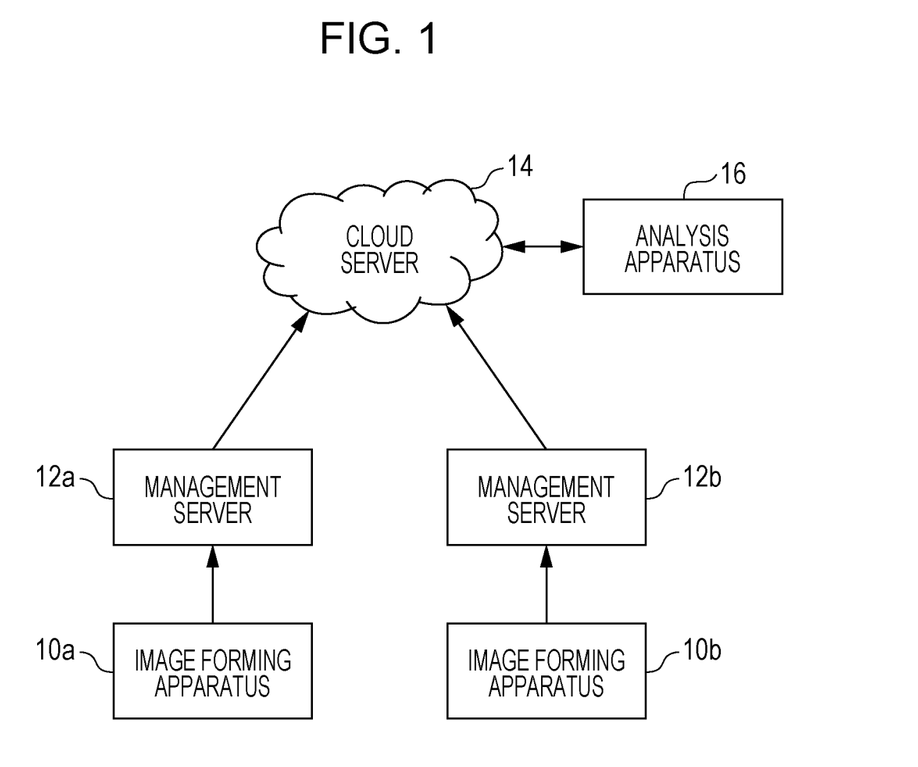
FIG. 1 is a first system configuration diagram according to an exemplary embodiment.

FIG. 1 is a system configuration diagram according to a first exemplary embodiment. The system includes plural image forming apparatuses 10a and 10b, plural management servers 12a and 12b, a cloud server 14, and an analysis apparatus 16.

The image forming apparatuses 10a and 10b are, for example, multifunction peripherals having plural functions including a copy function, a facsimile function, a printer function, and a scanner function. A user uses, for example, the copy or printer function of the image forming apparatus 10a or 10b to form a desired image. In FIG. 1, two image forming apparatuses, namely, the image forming apparatuses 10a and 10b, are illustrated; however, the number of image forming apparatuses may be one or three or more. The user logs in to the image forming apparatus 10a or 10b by inputting their ID and password to use the image forming apparatus 10a or 10b.

The management servers 12a and 12b are servers that manage usage history data of the image forming apparatuses 10a and 10b. The management server 12a successively collects and manages pieces of usage history data of the image forming apparatus 10a. The management server 12b successively collects and manages pieces of usage history data of the image forming apparatus 10b. The management servers 12a and 12b transmit the collected pieces of usage history data to the cloud server 14 to gather the pieces of usage history data. At this time, pieces of personal information included in the pieces of usage history data, which are gathered on the cloud, may be compromised. Taking into consideration such a case, the management servers 12a and 12b conceal (mask) the pieces of personal information and transfer the pieces of usage history data to the cloud server 14.

The cloud server 14 is a server computer on the Internet, and receives and saves pieces of usage history data transferred from the management servers 12a and 12b. The pieces of usage history data include personal information, which has been masked. The cloud server 14 uses the gathered pieces of usage history data to perform various types of statistical processing or analytical processing. Alternatively, the analysis apparatus 16, which is a third party, uses the gathered pieces of usage history data to perform various types of statistical processing or analytical processing and transmits the result of statistical processing or analytical processing to the cloud server 14. Even in the case where the analysis apparatus 16, which is a third party, uses the pieces of usage history data to perform statistical processing/analytical processing, the personal information has been masked and is unlikely to be externally compromised.

Figure 2:
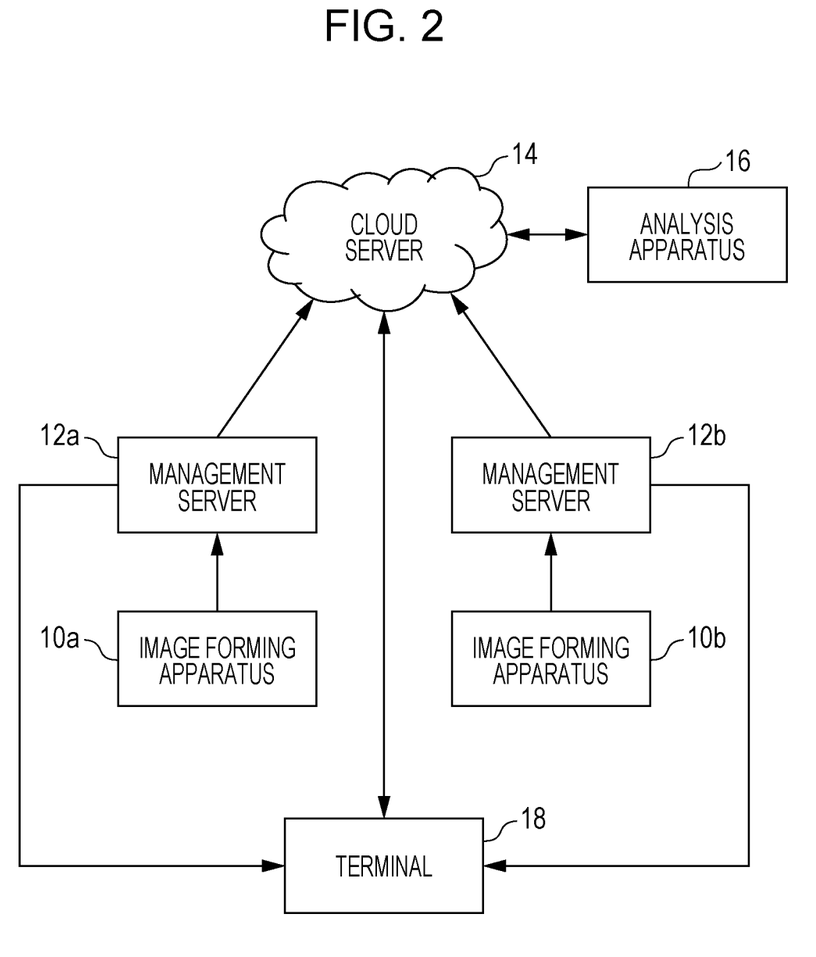
FIG. 2 is a second system configuration diagram according to an exemplary embodiment.

FIG. 2 is a system configuration diagram according to the first exemplary embodiment. This system configuration is a configuration in a case of viewing the result of statistical processing/analytical processing performed on pieces of usage history data saved on the cloud server 14.

A terminal 18 is a terminal, such as a personal computer (PC), a tablet, or a smartphone, operated by a user who wants to perform viewing, and accesses the cloud server 14 to request the result of statistical processing/analytical processing. In response to the request from the terminal 18, the cloud server 14 returns the result of statistical processing/analytical processing to the terminal 18. Here, personal information included in the result of statistical processing/analytical processing has been masked, which may lack usability. For example, in a case where a user wants to know their own usage, the user may need to recognize personal information.

Therefore, the management servers 12a and 12b transmit restoration information for restoring (unmasking) the personal information to the terminal 18 in association with a return of the result of statistical processing/analytical processing from the cloud server 14 to the terminal 18. The management servers 12a and 12b mask the personal information. Therefore, the restoration information is an unmask key corresponding to a mask key used in masking the personal information. When the mask key is assumed to be an encryption key, the unmask key corresponds to a decryption key. The terminal 18 processes the result of statistical processing/analytical processing returned from the cloud server 14 with the restoration information (decryption key) received from the management servers 12a and 12b, unmasks the personal information that has been masked to restore the personal information to the original state, and displays resulting information on the screen of the terminal 18. The user is able to view the result of statistical processing/analytical processing while recognizing the personal information. Here, transmission of restoration information in association with a return of the result of statistical processing/analytical processing means that restoration information is transmitted simultaneously with or subsequently to the result of statistical processing/analytical processing, which is triggered by a return of the result of statistical processing/analytical processing to the terminal 18.

Figure 3A:
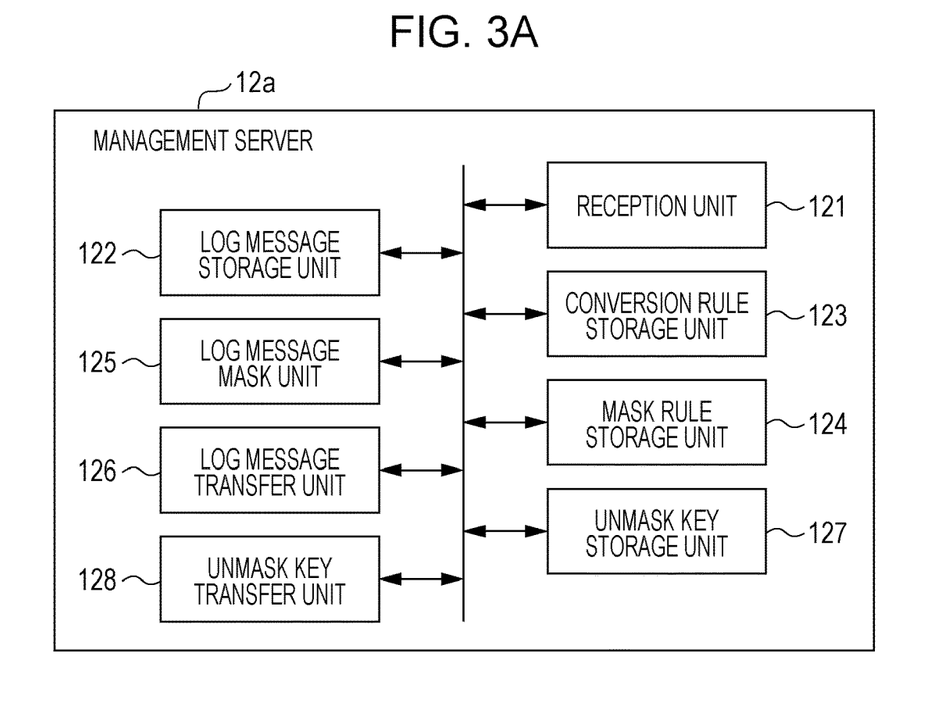
FIG. 3A is a functional block diagram of a management server according to an exemplary embodiment.

FIG. 3A is a functional block diagram of the management server 12a. The management server 12b has similar functional blocks.

The management server 12a includes functional blocks, namely, a reception unit 121, a log message storage unit 122, a conversion rule storage unit 123, a log message mask unit 125, a mask rule storage unit 124, a log message transfer unit 126, an unmask key storage unit 127, and an unmask key transfer unit 128.

The reception unit 121 receives usage history data (hereinafter referred to as "log message") of the image forming apparatus 10a from the image forming apparatus 10a. The reception unit 121 may receive a log message at any timing. The reception unit 121 may receive a log message each time the image forming apparatus 10a is used. The reception unit 121 may collectively receive, at a specific timing, log messages accumulated during a specific period.

The log message storage unit 122 stores a log message received by the reception unit 121.

The conversion rule storage unit 123 stores a conversion rule specified by the administrator. The conversion rule is a rule for conversion to a format suitable to statistical processing/analytical processing by the cloud server 14 or by the analysis apparatus 16.

The mask rule storage unit 124 stores, in a case where personal information is included in a log message, a rule for masking the personal information. The mask rule may differ depending on the personal information. For example, in a case where personal information includes the name, address, and age of a person, mask rules for the name, address, and age may differ from one another. As a matter of course, all pieces of personal information may be masked with a uniform rule. The mask rule storage unit 124 stores a mask rule together with a mask key for applying the rule. The mask key is a table or a function that defines a relation between personal information before masking and personal information after masking.

The log message mask unit 125 converts the format of a log message in accordance with a conversion rule stored in the conversion rule storage unit 123 and masks personal information included in the log message in accordance with a mask rule and a mask key stored in the mask rule storage unit 124.

The log message transfer unit 126 transfers a log message including masked personal information to the cloud server 14. The log message transfer unit 126 may transfer a log message at any timing. The log message mask unit 125 and the log message transfer unit 126 function as a transfer unit.

The unmask key storage unit 127 stores an unmask key for unmasking personal information. The unmask key is an inverse operation key of a mask key stored in the mask rule storage unit 124.

The unmask key transfer unit 128 functions as a transmission unit, and reads and transfers an unmask key stored in the unmask key storage unit 127 to the terminal 18 for restoring masked personal information.

Figure 3B:
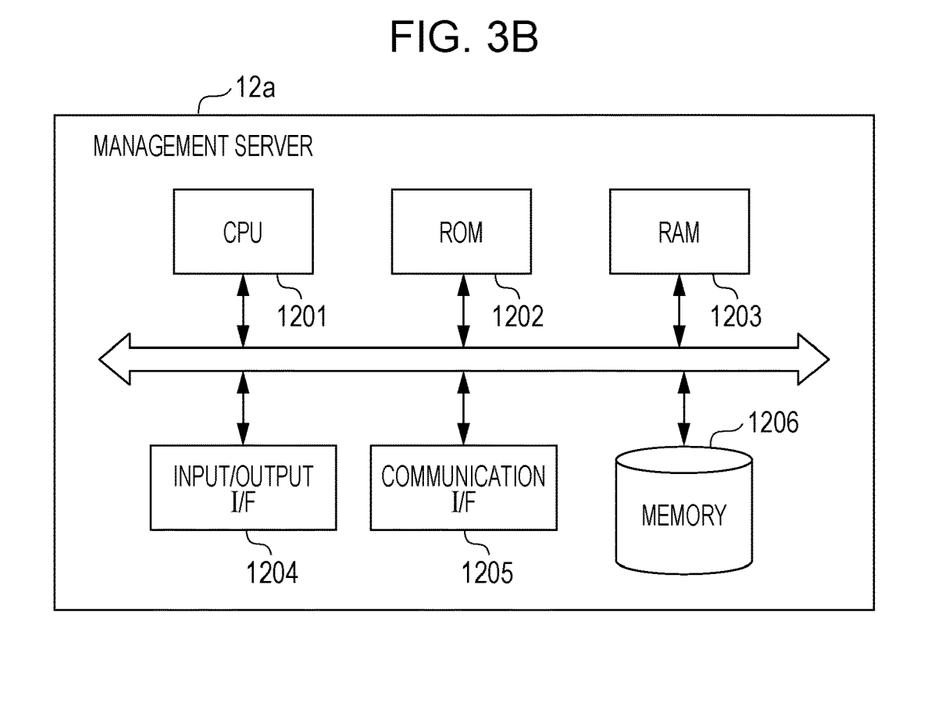
FIG. 3B is a block diagram illustrating a configuration of the management server according to an exemplary embodiment.

FIG. 3B is a block diagram illustrating a configuration of the management server 12a. The management server 12b has a similar configuration.

The management server 12a includes a central processing unit (CPU) 1201, a read-only memory (ROM) 1202, a random access memory (RAM) 1203, an input/output interface (I/F) 1204, a communication I/F 1205, and a memory 1206, which is, for example, a hard disk drive (HDD) or a solid state drive (SSD).

The CPU 1201 reads a process program stored in the ROM 1202 or in the memory 1206 and executes the process program while using the RAM 1203 as a working memory to implement various functions.

The input/output I/F 1204 is connected to an input device, such as a keyboard or a mouse, and to an output device, such as a display device. Through the input/output I/F 1204, various types of data are input and output. The administrator uses a device, such as a keyboard, to input a conversion rule, a mask rule, a mask key, and an unmask key.

The communication I/F 1205 is connected to a dedicated line and to the Internet. Through the communication I/F 1205, a log message is received from the image forming apparatus 10a or 10b via the dedicated line, and the log message, for which the format has been converted in accordance with a conversion rule and the personal information has been masked, is transmitted to the cloud server 14 via the Internet. Further, through the communication I/F 1205, an unmask key is transmitted to the terminal 18 via the dedicated line.

The memory 1206 stores a log message and further stores a conversion rule, a mask rule, a mask key, and an unmask key.

The CPU 1201 executes the process program to receive a log message from the image forming apparatus 10a or 10b and stores the log message in the memory 1206. The CPU 1201 stores, in the memory 1206, a conversion rule, a mask rule, a mask key, and an unmask key that have been input. The CPU 1201 converts the format of the log message stored in the memory 1206 in accordance with the conversion rule and determines whether personal information is included in the log message. In a case where personal information is included, the CPU 1201 masks the personal information in accordance with the mask rule and the mask key and stores the log message in the memory 1206. The CPU 1201 reads the log message including the masked personal information from the memory 1206 and transfers the log message to the cloud server 14. Further, the CPU 1201 reads the unmask key from the memory 1206 and transfers the unmask key to the terminal 18. The CPU 1201 transfers the unmask key at a timing that is associated with a timing at which the result of statistical processing/analytical processing is transmitted to the terminal 18 from the cloud server 14. That is, the CPU 1201 functions as the log message mask unit 125, the log message transfer unit 126, and the unmask key transfer unit 128 illustrated in FIG. 3A, the communication I/F 1205 functions as the reception unit 121 illustrated in FIG. 3A, and the memory 1206 functions as the log message storage unit 122, the conversion rule storage unit 123, the mask rule storage unit 124, and the unmask key storage unit 127 illustrated in FIG. 3A.

Note that some of the functional blocks illustrated in FIG. 3A need not be implemented as software processing implemented by executing the program and may be implemented as hardware processing. The hardware processing may be implemented by using a circuit, such as an application-specific integrated circuit (ASIC) or a field programmable gate array (FPGA).

Figure 4:
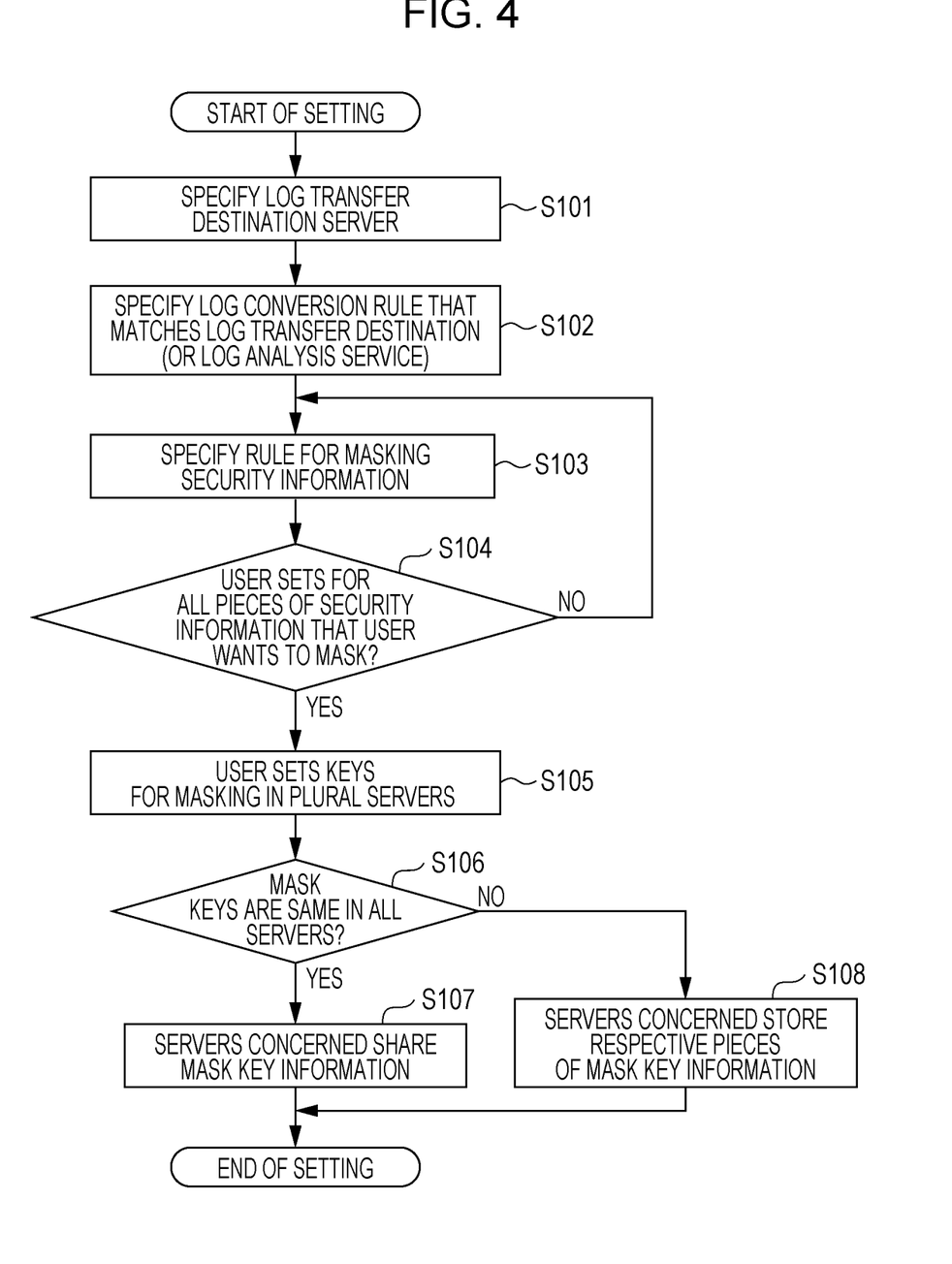
FIG. 4 is a first flowchart illustrating a process according to an exemplary embodiment.

FIG. 4 is a flowchart of a process according to the first exemplary embodiment and is a flowchart of a process performed upon setting.

First, the administrator specifies a destination, namely, the cloud server 14, to which a log message is transferred from the management server 12a or 12b (S101). Specifically, the administrator specifies the name or IP address of the cloud server 14. The specified information about the cloud server 14 is stored in the memory 1206.

Next, the administrator specifies a conversion rule, for the log message, that matches the log transfer destination (S102). The conversion rule is a rule for converting gathered log messages into a format suitable to statistical processing/analytical processing by the cloud server 14, which is a log message transfer destination. In a case where the cloud server 14 does not perform statistical processing/analytical processing but the analysis apparatus 16, which is a third party, performs statistical processing/analytical processing, the conversion rule is a rule for conversion into a format that is suitable to statistical processing/analytical processing by the analysis apparatus 16, which is a third party. The conversion rule (format conversion rule) is stored in the conversion rule storage unit 123.

Next, the administrator specifies a rule for masking personal information (security information) (S103). The mask rule is stored in the mask rule storage unit 124. A mask rule is set for each piece of personal information that the user wants to mask (S104).

After mask rules have been set for all pieces of personal information, the administrator sets a mask key for the management server 12a or 12b (S105). That is, the administrator sets a mask key as a tool for masking in accordance with each mask rule set in S103 and S104.

When the administrator sets a mask key, there may be a case where the management servers 12a and 12b share a mask key and a case where the management servers 12a and 12b use different mask keys. In the former case, a mask key is shared by the management servers 12a and 12b and stored in the mask rule storage unit 124. In the latter case, different mask keys for the management servers 12a and 12b are stored in the respective mask rule storage units 124 (S106, S107, and S108). As a matter of course, a mask key may be paired with an unmask key and stored in a storage unit other than the mask rule storage unit 124, namely, for example, the unmask key storage unit 127.

Figure 5:
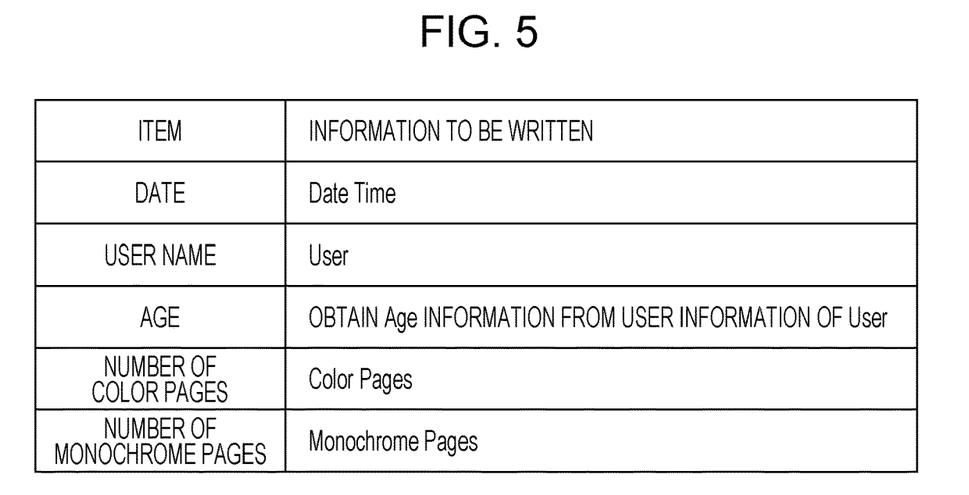
FIG. 5 is an explanatory diagram illustrating an example conversion rule according to an exemplary embodiment.

FIG. 5 illustrates an example conversion rule. In the conversion rule,
Date
User name
Age
Number of color pages
Number of monochrome pages
are specified as items. For each of the items, information to be written is as follows.
Date: Date Time
User name: User
Age: Obtain Age information from user information of User.
Number of color pages: Color Pages
Number of monochrome pages: Monochrome Pages
Here, User is the ID of a user who uses the image forming apparatus 10a or 10b.

Figure 6:
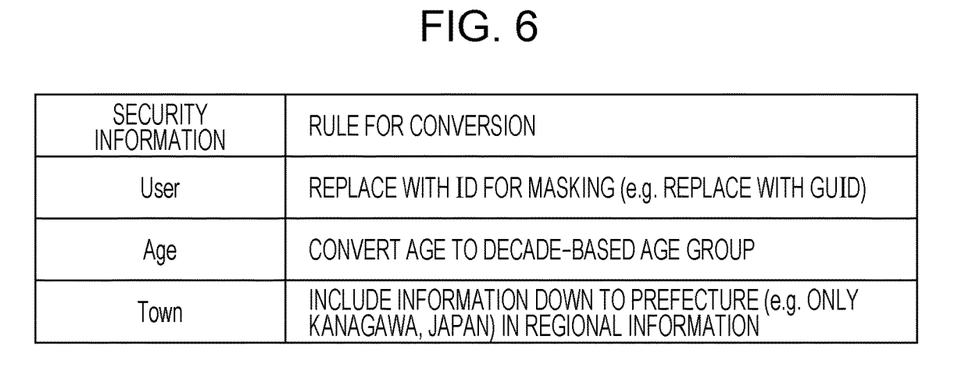
FIG. 6 is an explanatory diagram illustrating example mask rules according to an exemplary embodiment.

FIG. 6 illustrates example mask rules for pieces of personal information. As the pieces of personal information,
User
Age
Town
are specified. These are the ID, age, and address of a user who uses the image forming apparatus 10a or 10b. Mask rules for the respective pieces of personal information are
User: Replace with an ID for masking. For example, replace with a globally unique identifier (GUID).
Age: Convert to a decade-based age group.
Town: Include information down to prefecture information, namely, for example, "KANAGAWA, JAPAN" in regional information.

As a mask key for applying each mask rule, for User, a table in which correspondences between IDs and GUIDs are specified is used, for example. For Age, a function for conversion to a decade-based age group is used, for example. For Town, a function for deleting detailed address information on a level lower than the prefecture level is used, for example.

In an example mask process for User, an ID
XX12345
is converted to a GUID as follows
XX12345→{973497A4-9B00-4048-94C3-9766233A6E02}
and masked.

In the case where the management servers 12a and 12b use different mask keys, for example, the name of each management server may be added as an index in a mask process. Specifically, for example, the management server 12a performs a mask process as follows.
XX12345→Server1-{973497A4-9B00-4048-94C3-9766233A6E02}
For example, the management server 12b performs a mask process as follows.

XX12345→Server2-{973497A4-9B00-4048-94C3-9766233A6E02}

Figure 7:
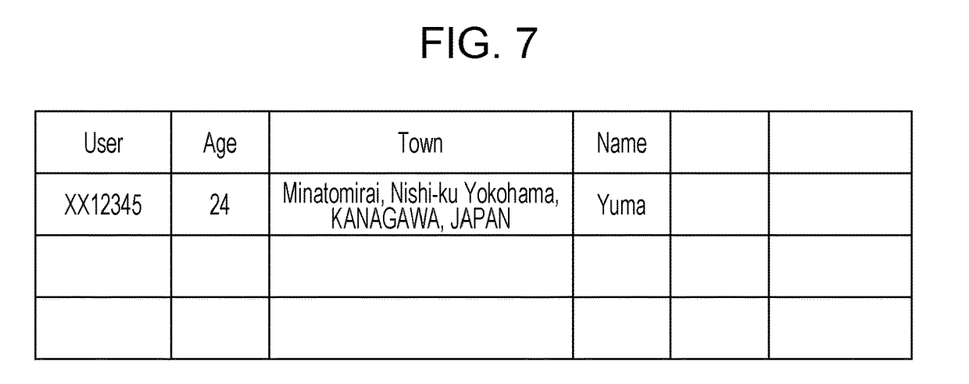
FIG. 7 is an explanatory diagram illustrating example user information according to an exemplary embodiment.

FIG. 7 illustrates example user information of a user who uses the image forming apparatus 10a or 10b. The user information includes items as follows.

User
Age
Town
Name

User is the ID of the user, Age is the age of the user, Town is the address of the user, and Name is the name of the user. The user information is registered in advance in the image forming apparatuses 10a and 10b and used to authenticate the user when the user logs in to the image forming apparatus 10a or 10b to use the image forming apparatus 10a or 10b. In a case where an authentication server is separately provided, the user information may be registered in the authentication server.

Figure 8:
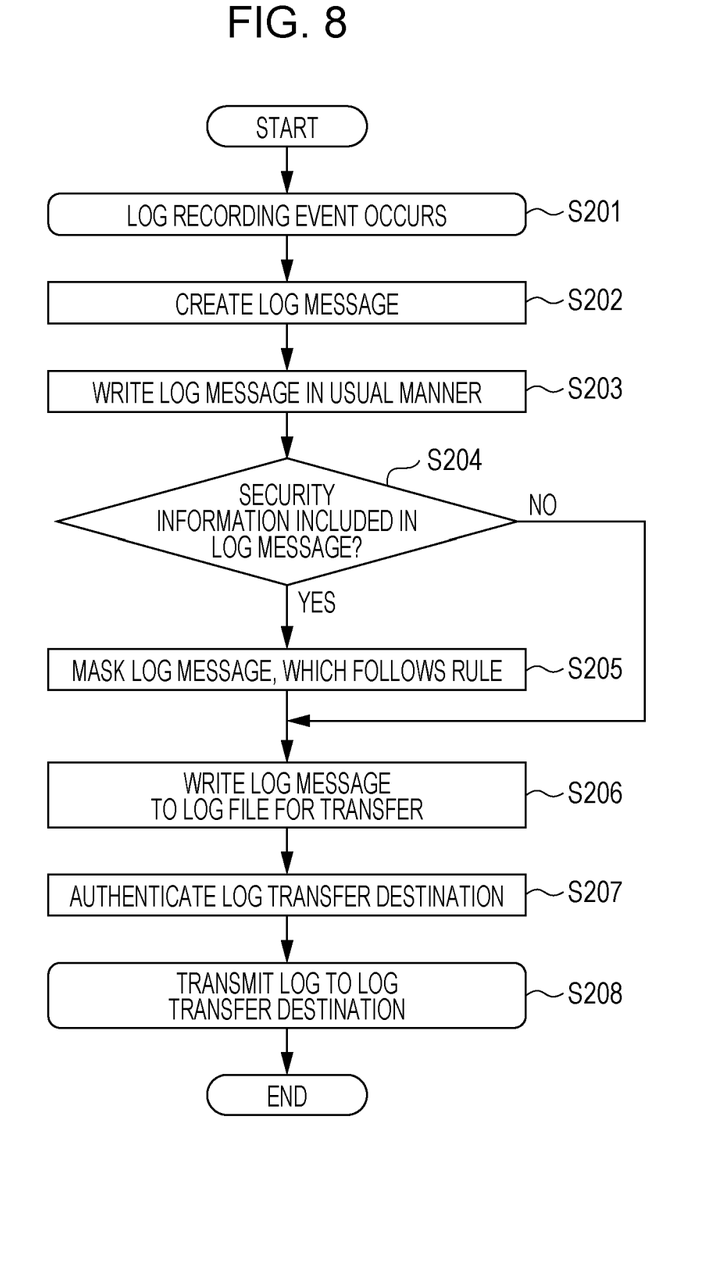
FIG. 8 is a second flowchart illustrating a process according to an exemplary embodiment.

FIG. 8 is a flowchart of a process according to the first exemplary embodiment and illustrates a process performed after a user has used the image forming apparatus 10a or 10b and a log has been generated.

When an event of the image forming apparatus 10a or 10b storing a log occurs (S201), the image forming apparatus 10a or 10b creates a log message about the event (S202) and writes the log message to the log message storage unit 122 of the management server 12a or 12b (S203). The log message includes the date of the event, a user ID, the operation, and so on. The user ID is input when the user logs in to the image forming apparatus 10a or 10b for operating the image forming apparatus 10a or 10b. In a case of login using, for example, face recognition, a user ID associated with the user who has been authenticated using face recognition is obtained from user information.

The CPU 1201 of the management server 12a or 12b determines whether personal information (security information) is included in the log message written to the log message storage unit 122 (S204). If personal information is included (Yes in S204), the CPU 1201 masks the log message, which follows a conversion rule (S205). That is, the CPU 1201 converts the format of the log message stored in the log message storage unit 122 in accordance with a conversion rule stored in the conversion rule storage unit 123, and thereafter, masks personal information portion. Subsequently, the CPU 1201 writes the masked log message to a log file for transfer (S206).

On the other hand, if personal information is not included in the log message (No in S204), the CPU 1201 writes the log message to the log file for transfer without masking the log message. Also in this case, the CPU 1201 converts the format of the log message in accordance with the conversion rule, and thereafter, writes the log message to the log file for transfer.

Next, the CPU 1201 authenticates the cloud server 14, which is a log transfer destination (S207), and transfers the log message, for which the included personal information has been masked, to the cloud server 14 (S208).

Log message transfer to the cloud server 14 may be performed
(1) at a timing when the size of accumulated log messages reaches a predetermined size,
(2) at predetermined time intervals, such as every day or every hour, or
(3) at a timing when a log recording event occurs.

Figure 9:
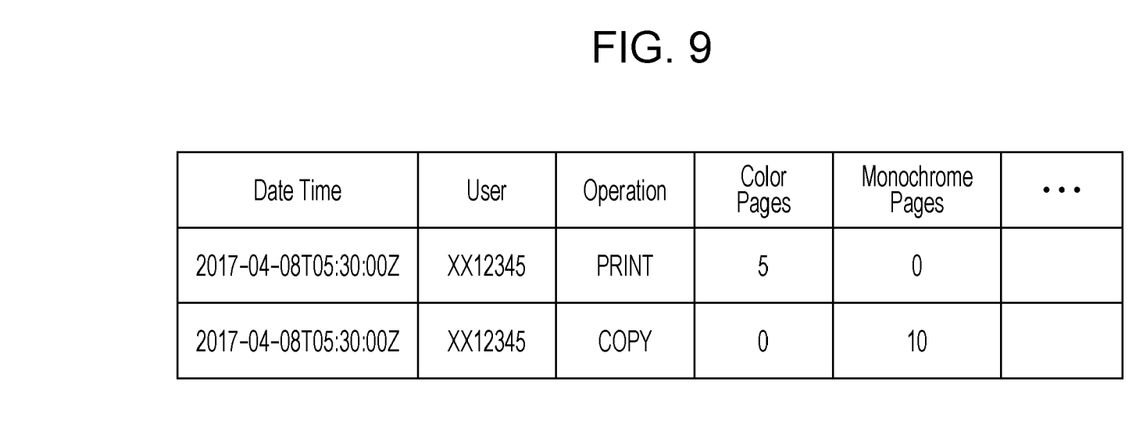
FIG. 9 is an explanatory diagram illustrating example log messages according to an exemplary embodiment.

FIG. 9 illustrates example log messages created by the image forming apparatus 10a or 10b. Each log message includes items as follows.

Date (Date Time)
User ID (User)
Type of operation (Operation)
Number of color pages (Color Pages)
Number of monochrome pages (Monochrome Pages)

For example, in a case where a user operates the image forming apparatus 10a to print five color pages, the log message includes the following.

Date: 2017 Apr. 8 T05:30:00Z
User ID: XX12345
Type of operation: Print
Number of color pages: 5
Number of monochrome pages: 0

The user ID is an ID input upon user login, as described above.

The log messages illustrated in FIG. 9 do not include the age (Age) of the user. Therefore, in a case where the conversion rule as illustrated in FIG. 5 is used, that is, in a case where Date
User name
Age
Number of color pages
Number of monochrome pages are included in the conversion rule, the CPU 1201 of the management server 12a or 12b obtains age (Age) information from user information of the user and converts the format of the log message. If the user information is registered in the image forming apparatuses 10a and 10b, the CPU 1201 of the management server 12a or 12b obtains the user information. If the user information is registered in an authentication server, the CPU 1201 obtains the user information from the authentication server.

Figure 10:
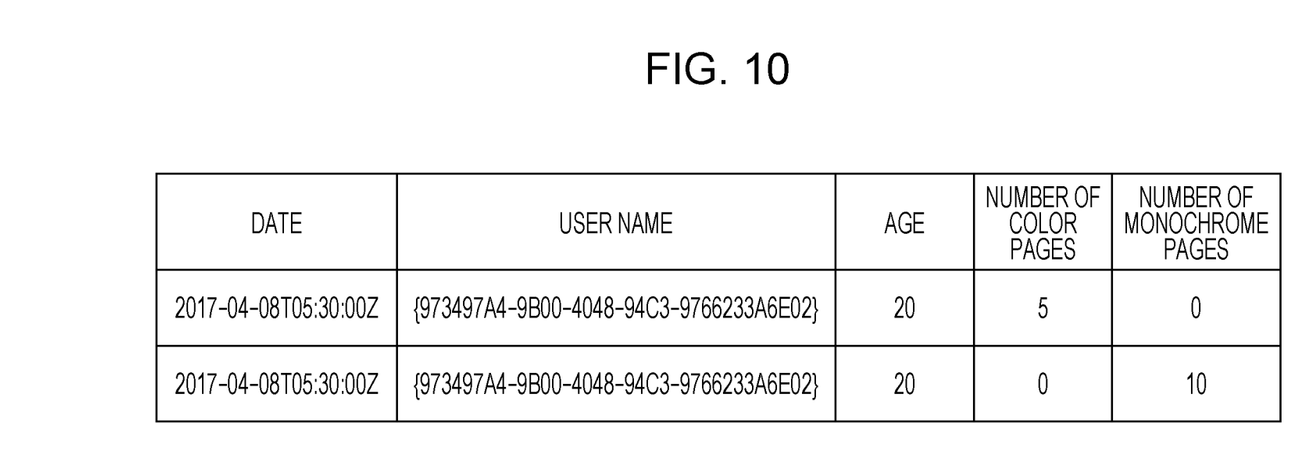
FIG. 10 is an explanatory diagram illustrating example output from a log analysis service according to an exemplary embodiment.

FIG. 10 illustrates an example of the result of converting the format of log messages in accordance with a conversion rule and masking personal information. Among the items Date
User name
Age
Number of color pages
Number of monochrome pages included in the conversion rule, the user name and the age are personal information. Therefore, the CPU 1201 masks these items in accordance with respective mask rules. For example, in a case where the mask rules as illustrated in FIG. 6 are used, the CPU 1201 converts the user name to a GUID, and converts the age to a decade-based age group. Accordingly, in a case where the user name is
XX12345
and the age is
24,
the user name is masked as follows
XX12345→{973497A4-9B00-4048-94C3-9766233A6E02}
and the age is masked as follows
24→20.

The date, the number of color pages, and the number of monochrome pages are not personal information (security information) and are not masked. The log messages illustrated in FIG. 10 are transferred to the cloud server 14 and saved on the cloud server 14. The cloud server 14 or the analysis apparatus 16, which is a third party, performs statistical processing/analytical processing on such a group of log messages, saves the result of analysis, and provides the result of analysis for use by the terminal 18.

Figure 11:
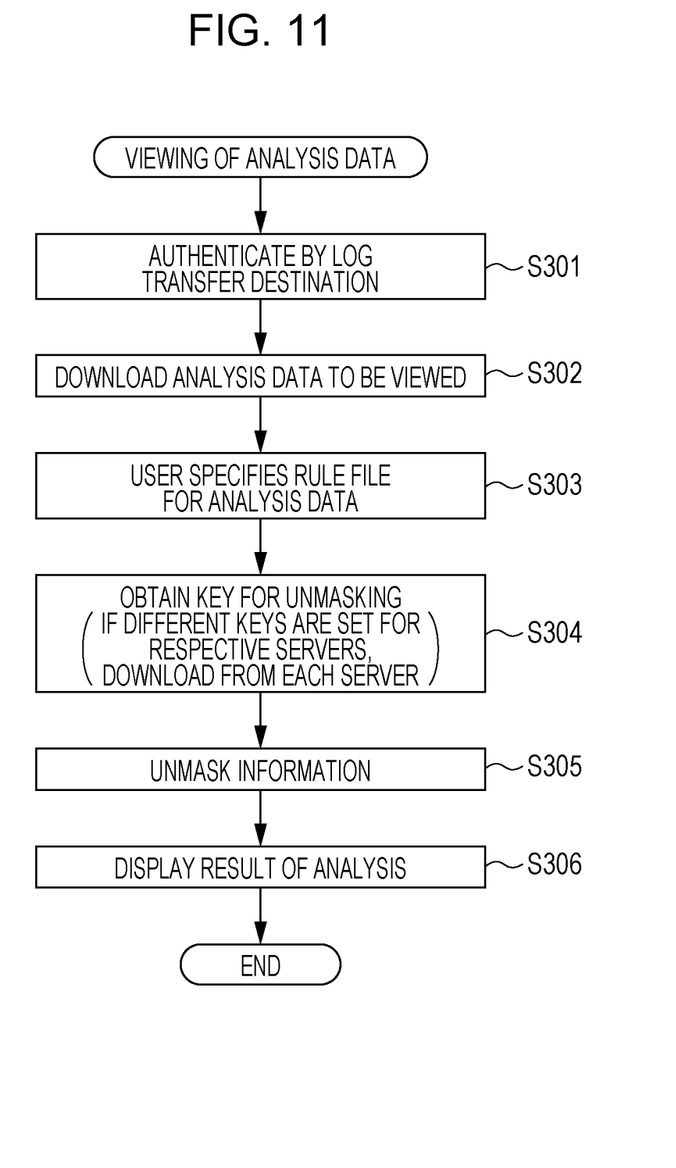
FIG. 11 is a third flowchart illustrating a process according to an exemplary embodiment.

FIG. 11 is a flowchart of a process according to the first exemplary embodiment and illustrates a process for viewing the result of statistical processing/analytical processing (hereinafter referred to as "analysis data").

A user operates the terminal 18 to access the cloud server 14, which is a log transfer destination, for authentication (S301). After the cloud server 14 has verified that the user has due authority to view analysis data, the terminal 18 downloads the analysis data from the cloud server 14 (S302).

Next, the user operates the terminal 18 to specify a conversion rule file for the analysis data (S303) and obtains an unmask key for unmasking (S304). The user need not specify a conversion rule file and may view the analysis data in the current format as is. In the case where the user specifies a conversion rule file, the format is converted in accordance with the conversion rule. In S304, a request for obtaining an unmask key is transmitted from the terminal 18 to the cloud server 14, and the cloud server 14 outputs, to the management servers 12a and 12b, a request for transmitting an unmask key to the terminal 18. In response to the request from the cloud server 14, the CPU 1201 of the management servers 12a and 12b transmits an unmask key to the terminal 18. In a case where the management servers 12a and 12b share a mask key, the management servers 12a and 12b also share an unmask key, and therefore, one of the management servers 12a and 12b needs to transmit the unmask key to the terminal 18. In S304, the terminal 18 may request the management servers 12a and 12b to transmit an unmask key.

More specifically, the above-described operation is performed as follows. When the CPU of the terminal 18 receives analysis data from the cloud server 14, the CPU identifies, on the basis of mask information included in the analysis data, the management server 12a or 12b that has masked the analysis data, and makes a request for an unmask key to the identified management server 12a or 12b. In response to the request from the terminal 18, the CPU 1201 of the management server 12a or 12b returns an unmask key to the terminal 18.

After obtaining the unmask key from the management server 12a or 12b, the CPU of the terminal 18 uses the obtained unmask key to unmask the analysis data and obtain the original personal information (S305), and displays the result of analysis on the screen of the terminal 18 (S306).

Figure 12:
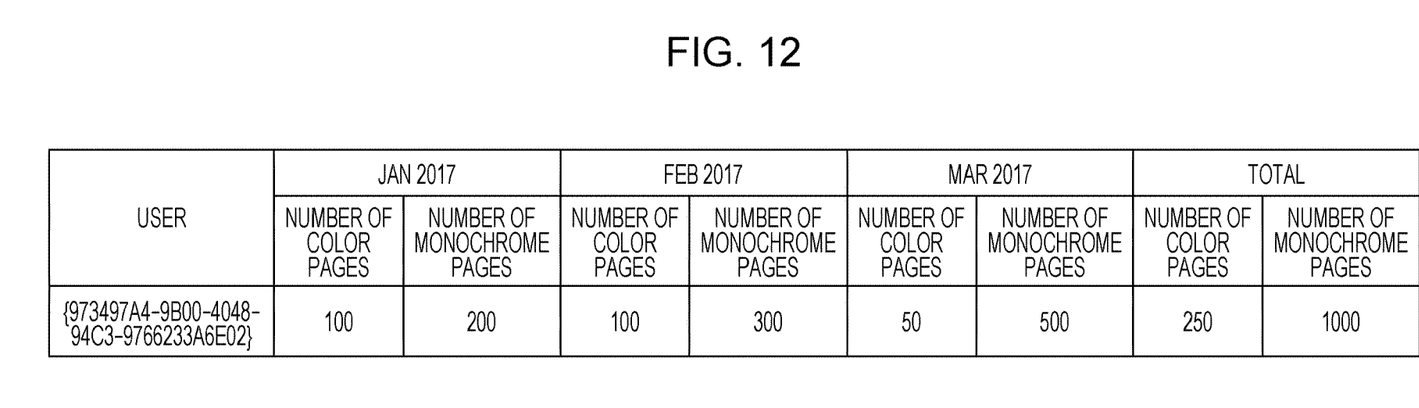
FIG. 12 is an explanatory diagram illustrating an example analysis result (masked) from a log analysis service according to an exemplary embodiment.

FIG. 12 illustrates example analysis data obtained as a result of an analysis by the cloud server 14 or by the analysis apparatus 16. The analysis data is the result of statistical processing and indicates the number of color pages and the number of monochrome pages printed by a specific user every month. The user name is masked with a GUID as described above.

Figure 13:
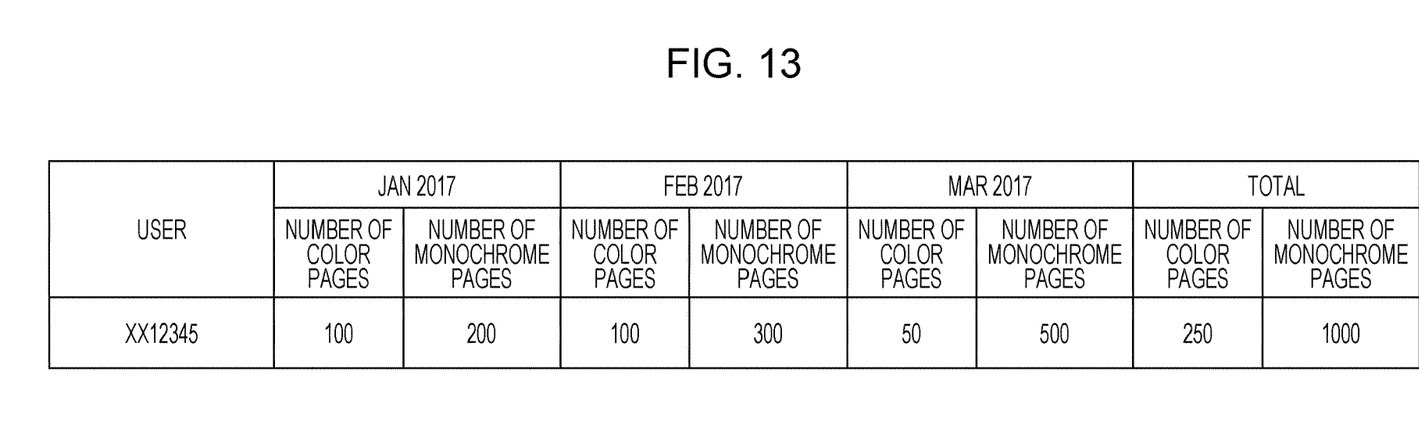
FIG. 13 is an explanatory diagram illustrating an example analysis result (unmasked) from a log analysis service according to an exemplary embodiment.

FIG. 13 illustrates the result of unmasking the user name by using an unmask key obtained from the management server 12a or 12b. The user name is unmasked as follows
{973497A4-9B00-4048-94C3-9766233A6E02}→XX12345
and restored to the original user ID.

Figure 14:
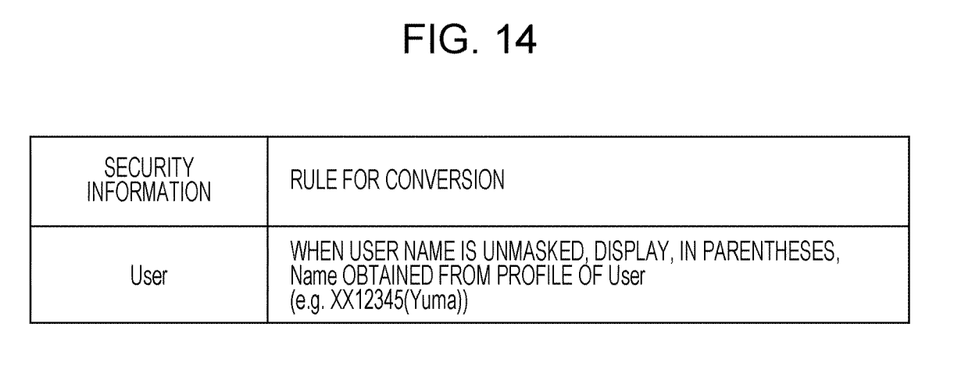
FIG. 14 is an explanatory diagram illustrating another example mask rule according to an exemplary embodiment.

FIG. 14 is an example of the conversion rule file specified by the user in S303. This is a rule that, when a user name is to be unmasked, Name is obtained from user information and put in parentheses. This rule corresponds to the user information illustrated in FIG. 7, which includes Name, and is a rule that Name is obtained.

Figure 15:
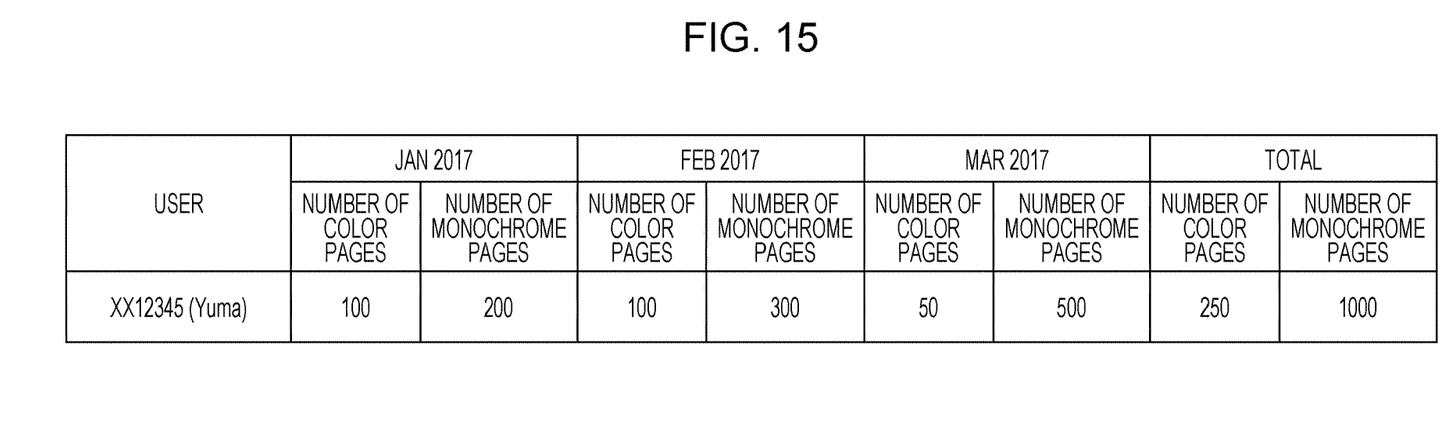
FIG. 15 is an explanatory diagram illustrating an example analysis result (masked) from another log analysis service according to an exemplary embodiment.

FIG. 15 illustrates example analysis data that has been unmasked in a case of applying the conversion rule illustrated in FIG. 14. As the user name, Name in parentheses is added to the analysis data illustrated in FIG. 13.

As described above, in the first exemplary embodiment, personal information included in log messages is masked, and the log messages are gathered in the cloud server 14. The group of log messages including the masked personal information is subjected to statistical processing/analytical processing, and the result is provided to the terminal 18. Further, an unmask key is obtained from the management server 12a or 12b that has masked the personal information, and the personal information is unmasked so as to make the analysis data viewable.

Second Exemplary Embodiment

In the first exemplary embodiment, a request for viewing analysis data is transmitted from the terminal 18 to the cloud server 14; however, a request for viewing analysis data need not be transmitted to the cloud server 14 and may be transmitted to one of the management servers 12a and 12b.

Figure 16:
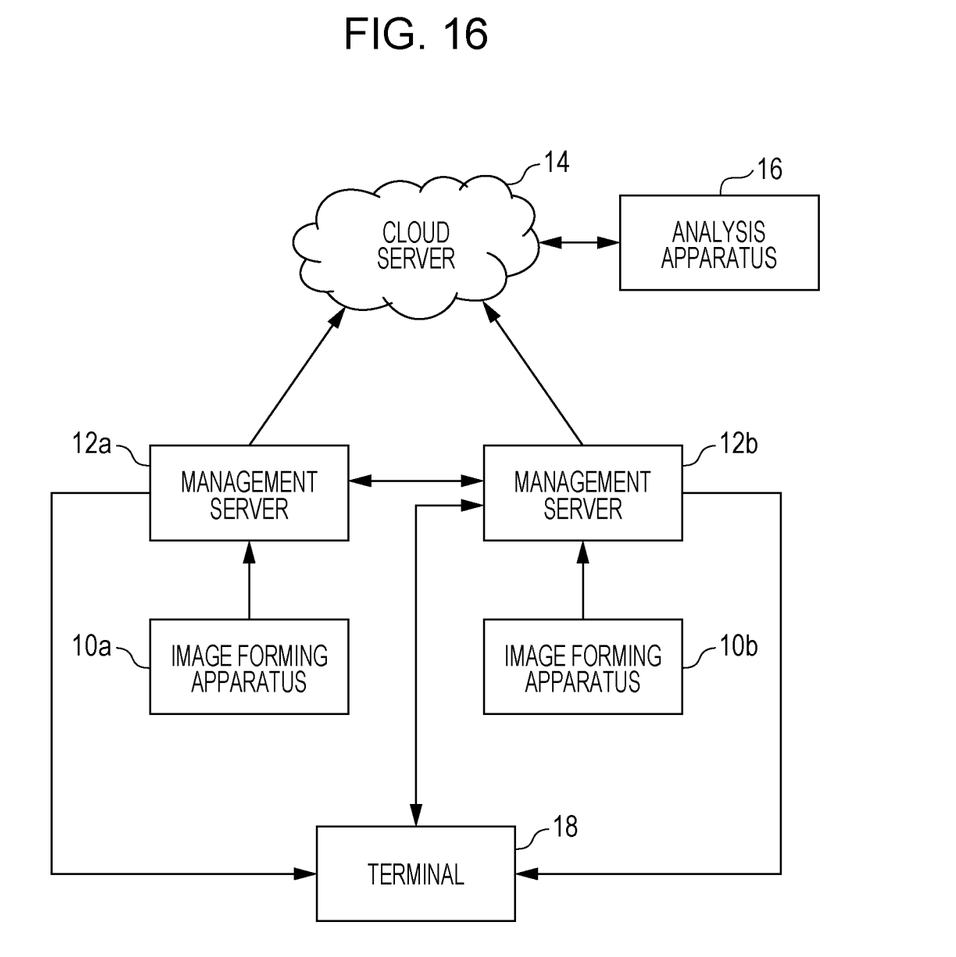
FIG. 16 is a system configuration diagram according to another exemplary embodiment.

FIG. 16 is a system configuration diagram according to a second exemplary embodiment. The second exemplary embodiment is described under the assumption as follows. As in the first exemplary embodiment, personal information included in log messages is masked by the management servers 12a and 12b, and thereafter, the log messages are gathered in the cloud server 14. Then, the cloud server 14 or the analysis apparatus 16 performs statistical processing/analytical processing, and the cloud server 14 saves the result.

A user operates the terminal 18 to make a request for viewing analysis data to one of the management servers 12a and 12b, namely, for example, the management server 12b, as illustrated in FIG. 16.

In response to the request, the CPU 1201 of the management server 12b accesses the cloud server 14 and makes a request for transmitting analysis data. In a case where the user is found to have due authority as a result of authentication, the cloud server 14 transmits analysis data to the management server 12b, and the CPU 1201 of the management server 12b transfers the obtained analysis data to the terminal 18. The CPU 1201 of the management server 12b functions as an analysis data transmission unit. The CPU 1201 of the management server 12b transmits an unmask key to the terminal 18 together with the analysis data. In a case where the management servers 12a and 12b have different pieces of mask data, the management server 12b accesses the management server 12a, obtains an unmask key, and transmits the unmask key to the terminal 18 together with the unmask key of the management server 12b.

With the above-described configuration, personal information included in log messages is masked, and the log messages are gathered in the cloud server 14. The group of log messages including the masked personal information is subjected to statistical processing/analytical processing, and the result is provided to the terminal 18. Further, an unmask key is obtained from the management server 12a or 12b that has masked the personal information, and the personal information is unmasked so as to make the analysis data viewable.

Although exemplary embodiments of the present invention have been described above, the present invention is not limited to the above-described exemplary embodiments, and various modifications may be made, which will be described below.

First Modification

In the exemplary embodiments, the image forming apparatuses 10a and 10b create and transmit to the management servers 12a and 12b log messages, the management servers 12*a* and 12*b* mask personal information included in the log messages, and thereafter, the log messages are gathered in the cloud server 14. However, the image forming apparatuses 10*a* and 10*b* may create log messages and mask personal information, and thereafter, the log messages may be gathered in the cloud server 14 (without passing through the management servers 12*a* and 12*b*). In this case, the function of the management servers 12*a* and 12*b* is added to the image forming apparatuses 10*a* and 10*b*. The terminal 18 needs to obtain analysis data from the cloud server 14 and to obtain an unmask key for unmasking the personal information from the image forming apparatuses 10*a* and 10*b*.

Second Modification

In the exemplary embodiments, the management servers 12*a* and 12*b* transmit an unmask key to the terminal 18, and the terminal 18 uses the unmask key to unmask personal information and restore the personal information to the original personal information. However, pieces of personal information that may be unmasked may be limited in accordance with authority given to the user who is to perform viewing. For example, for a user who has special authority, unmask keys for unmasking all pieces of personal information are transmitted to the terminal 18. For example, for a user who does not have special authority, corresponding unmask keys for unmasking age and address information among all pieces of personal information are transmitted to the terminal 18, and unmasking of user names is not allowed.

Third Modification

In the exemplary embodiments, in the case where the management servers 12*a* and 12*b* use different mask keys, information with which a management server that has masked a log message is identifiable may be added as metadata of the personal information. In a case where analysis data is obtained and the personal information is unmasked, the terminal 18 may identify the management server that has masked the personal information from the metadata of the personal information and may request the identified management server to transmit an unmask key.

Fourth Modification

Although the exemplary embodiments illustrate the image forming apparatuses 10*a* and 10*b*, the exemplary embodiments are applicable to any apparatus that the user is able to operate. For example, a usage history (including viewed Web pages) of a PC is transmitted to the management server 12*a* or 12*b* as log messages, and the log messages are gathered in the cloud server 14 and used in, for example, analytical processing.

Fifth Modification

In the exemplary embodiments, in the example method for masking personal information using mask keys that are different between the management servers 12*a* and 12*b*, the name of each server is added as an index in the mask process. Alternatively, for example, the management servers 12*a* and 12*b* may use different conversion tables or may use different encryption keys. In a case where personal information processed by the management server 12*a* and that processed by the management server 12*b* differ in level, the degree of masking may be changed in accordance with the difference in level.

Sixth Modification

Although the exemplary embodiments illustrate the cloud server 14 as a server in which log messages are gathered, the exemplary embodiments are applicable to any server that is in an environment in which the necessity to protect personal information from being compromised is high.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A management server comprising:
 a transfer unit that conceals, in a case where personal information is included in usage history data of an apparatus, the personal information according to a predetermined rule, and transfers the usage history data including the concealed personal information and a usage information that is not concealed to a server; and
 a transmission unit that transmits, in a case where analysis data of the usage history data is transmitted to a terminal, restoration information for restoring at least a piece of the concealed personal information included in the analysis data to the terminal,
 wherein the management server is configured to instruct a display of the terminal to display the usage information alongside the concealed personal information or the restored personal information, the selection whether to display the restored personal information instead of the concealed personal information being conditioned upon whether or not the restoration information is transmitted to the terminal, and
 wherein the selection as to whether to display the restored personal information instead of the concealed personal information depends on an authority of a user who is to perform viewing of the usage information and the personal information.

2. The management server according to claim 1, wherein the analysis data is transmitted to the terminal from the server in response to a request from the terminal.

3. The management server according to claim 2, wherein the transmission unit transmits the restoration information to the terminal in response to a request from the server.

4. The management server according to claim 2, wherein the transmission unit transmits the restoration information to the terminal in response to a request from the terminal.

5. The management server according to claim 1, further comprising
 an analysis data transmission unit that, in response to a request from the terminal, obtains the analysis data from the server and transmits the analysis data to the terminal.

6. The management server according to claim 5, wherein the transmission unit transmits the restoration information to the terminal in response to a request from the terminal.

7. The management server according to claim 1, wherein the transfer unit further converts a format of the usage history data.

8. The management server according to claim 2, wherein the transfer unit further converts a format of the usage history data.

9. The management server according to claim 3, wherein the transfer unit further converts a format of the usage history data.

10. The management server according to claim 4, wherein the transfer unit further converts a format of the usage history data.

11. The management server according to claim 5, wherein the transfer unit further converts a format of the usage history data.

12. The management server according to claim 6, wherein the transfer unit further converts a format of the usage history data.

13. The management server according to claim 1, wherein the personal information includes at least one of an ID, an address, and an age of a user of the apparatus.

14. A data viewing system comprising:
a management server that obtains usage history data from an apparatus;
a server that stores the usage history data transferred from the management server; and
a terminal, wherein
the management server includes
   a transfer unit that conceals, in a case where personal information is included in the usage history data, the personal information according to a predetermined rule, and transfers the usage history data including the concealed personal information and a usage information that is not concealed to the server, and
   a transmission unit that transmits, in a case where analysis data of the usage history data is transmitted to the terminal, restoration information for restoring the concealed personal information included in the analysis data to the terminal,
wherein the management server is configured to instruct a display of the terminal to display the usage information alongside the concealed personal information or the restored personal information, the selection whether to display the restored personal information instead of the concealed personal information being conditioned upon whether or not the restoration information is transmitted to the terminal, and
wherein the selection as to whether to display the restored personal information instead of the concealed personal information depends on an authority of a user who is to perform viewing of the usage information and the personal information.

15. The data viewing system according to claim 14, wherein
the management server includes a plurality of management servers, and
the transfer units of the plurality of management servers conceal the personal information using an identical method.

16. The data viewing system according to claim 14, wherein
the management server includes a plurality of management servers, and
the transfer units of the plurality of management servers conceal the personal information using different methods.

17. A non-transitory computer readable medium storing a program causing a computer to execute a process for management, the process comprising:
receiving usage history data of an apparatus;
concealing, in a case where personal information is included in the usage history data, the personal information according to a predetermined rule;
transferring the usage history data including the concealed personal information and a usage information that is not concealed to a server;
transmitting, in a case where analysis data of the usage history data is transmitted to a terminal, restoration information for restoring the concealed personal information included in the analysis data to the terminal; and
instructing a display of the terminal to display the usage information alongside the concealed personal information or the restored personal information, the selection whether to display the restored personal information instead of the concealed personal information being conditioned upon whether or not the restoration information is transmitted to the terminal,
wherein the selection as to whether to display the restored personal information instead of the concealed personal information depends on an authority of a user who is to perform viewing of the usage information and the personal information.

* * * * *